Figure 2:
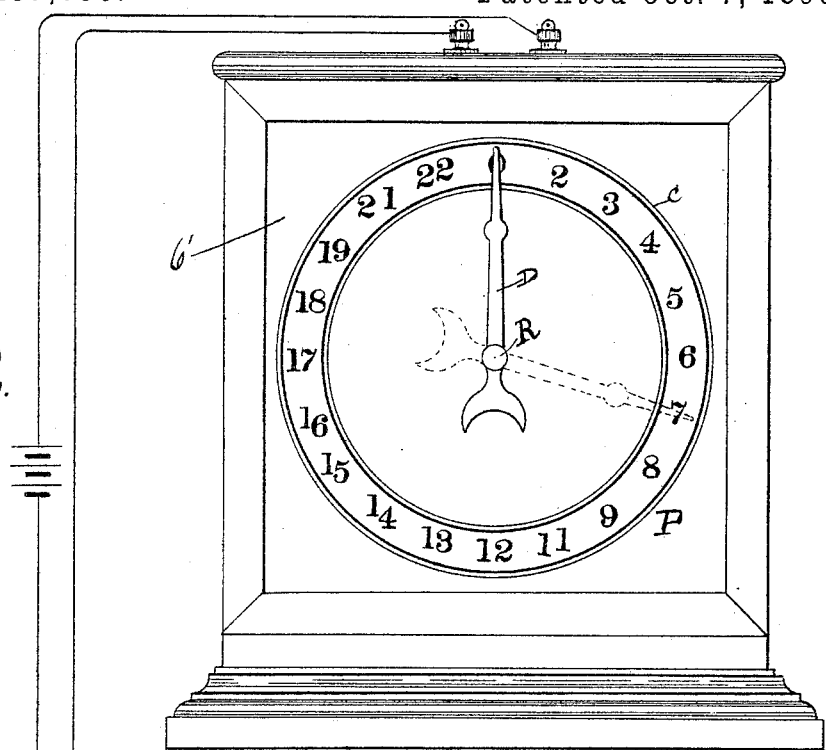

(No Model.) 3 Sheets—Sheet 1.

D. KELLEY & M. C. PARKHURST.
ELECTRICAL TRANSMITTER AND INDICATOR.

No. 437,859. Patented Oct. 7, 1890.

WITNESSES. INVENTOR.

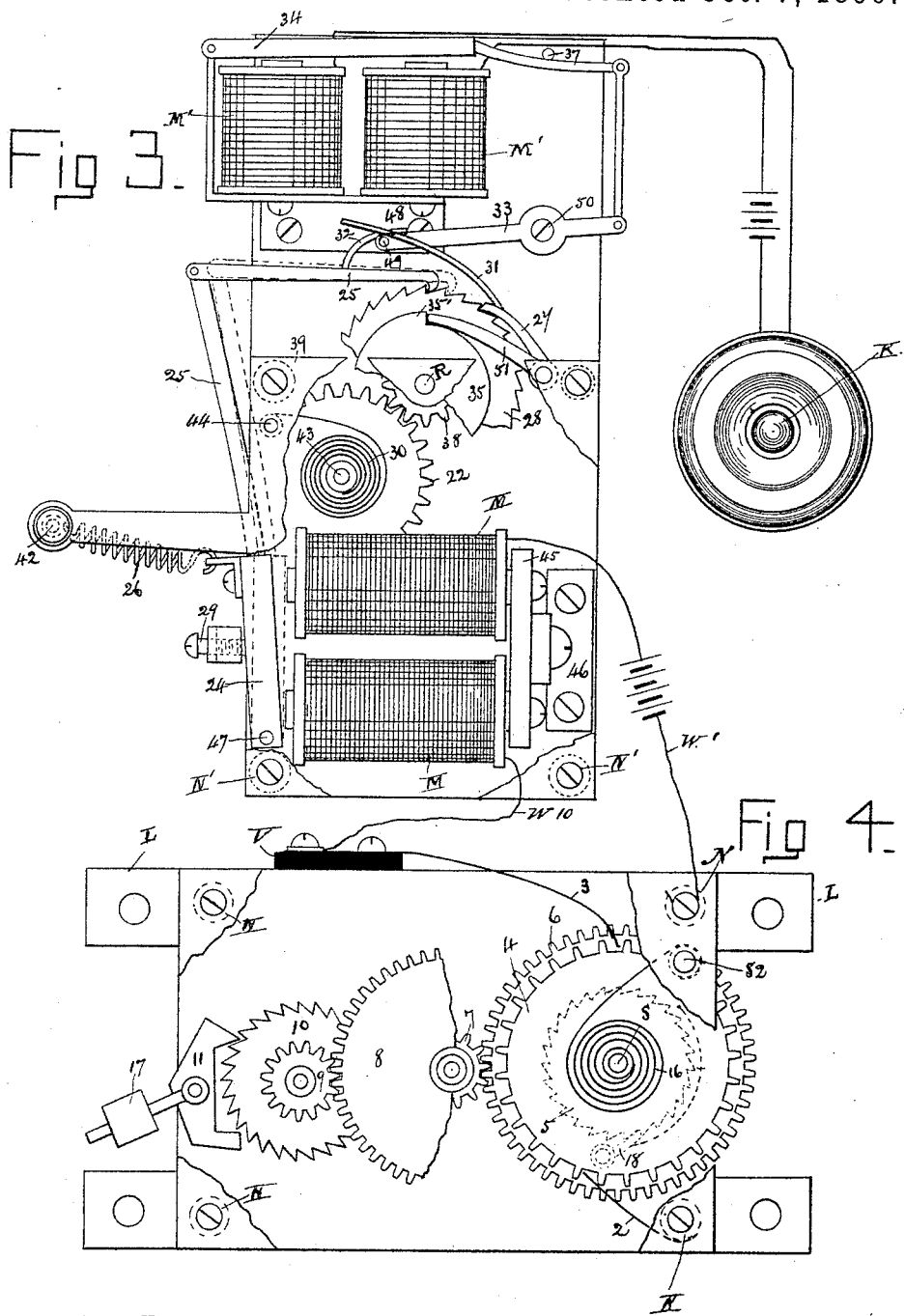

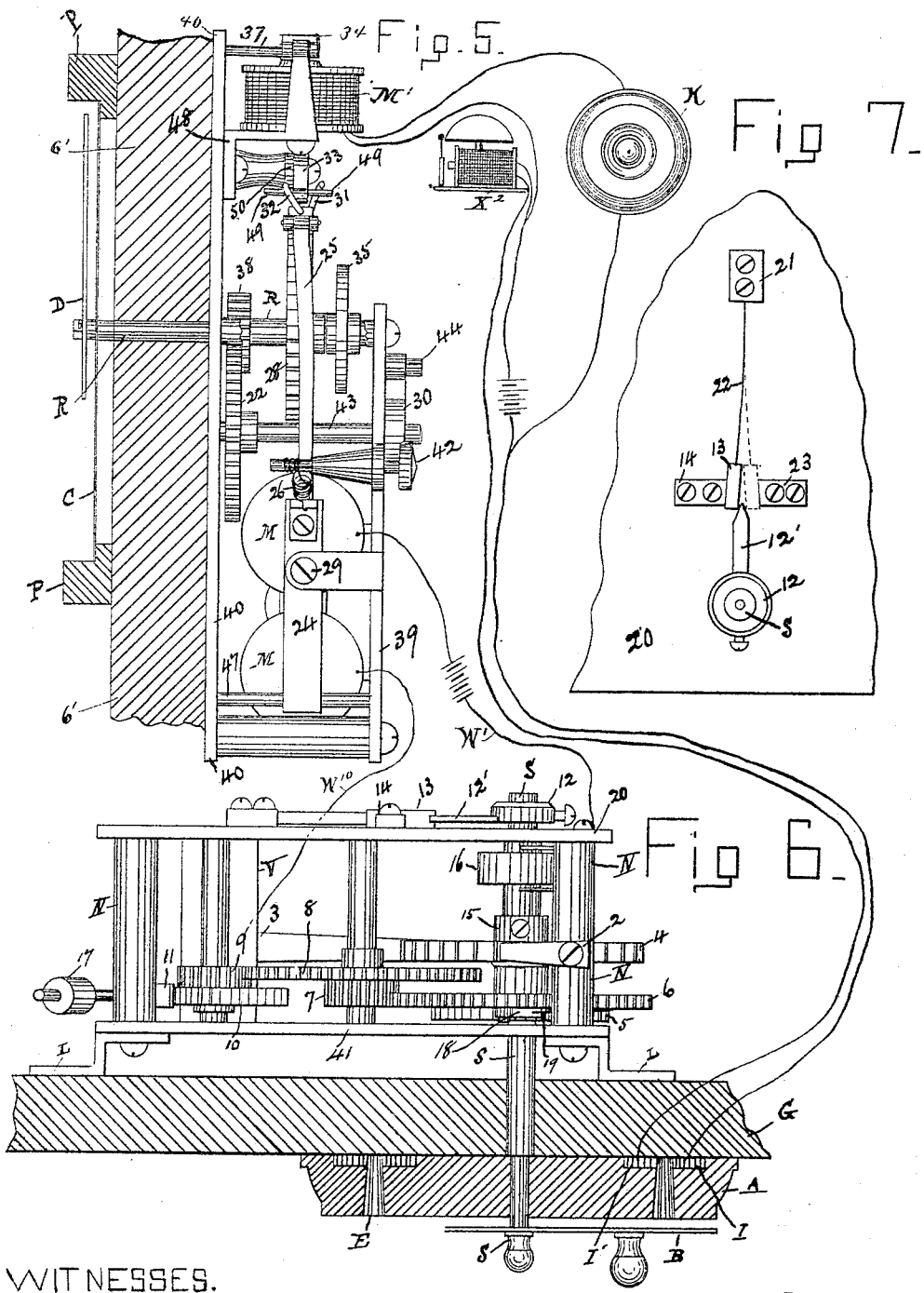

UNITED STATES PATENT OFFICE.

DENNIS KELLEY AND MELVILLE C. PARKHURST, OF SOMERVILLE, MASSACHUSETTS.

ELECTRICAL TRANSMITTER AND INDICATOR.

SPECIFICATION forming part of Letters Patent No. 437,859, dated October 7, 1890.

Application filed January 24, 1890. Serial No. 338,036. (No model.)

*To all whom it may concern:*

Be it known that we, DENNIS KELLEY and MELVILLE C. PARKHURST, of Somerville, in the county of Middlesex and State of Massachusetts, have invented certain new and useful Improvements in Electric Transmitters and Indicators, of which the following is a specification.

Our invention relates to electrical transmitting and indicating devices, and has for its object to provide improved means whereby signals or calls can be transmitted by electricity between two or more stations at a distance from each other by means of a transmitting-instrument at one of the stations electrically connected with a receiving and indicating instrument at the other station, the said transmitting and receiving instruments being provided with dials, upon the faces of which, arranged in a circle around the center and equidistant from each other, are numbers, names, letters, or characters, (we prefer numbers,) the order of their arrangement being the same upon both dials.

The transmitting-instrument has a dial upon which any number of names, letters, characters, or numbers are arranged consecutively in a circle near the edge of the dial and equidistant from each other. The dial has a series of small orifices extending through it, there being one hole for each number, said holes being for the reception of a circuit-closing plug, which makes contact with and electrically connects two metallic concentric rings secured to the inner surface of the dial and separated by space sufficient to properly insulate them. The transmitting-instrument also has a rotary shaft or spindle, upon which is a pointer adapted to coincide with either of the characters on the dial, and a spring and a suitable escapement mechanism whereby the shaft is slowly rotated back to its starting or zero point after it has been rotated to bring its pointer into coincidence with either of the characters. The rotation of the shaft by said spring causes a circuit breaking and closing mechanism to close and break an electric circuit which includes the receiving-instrument, the number of closures of said circuit being the same as the number of the character to which the pointer was moved. The receiving-instrument also has a rotary shaft or spindle having a pointer and electrically-controlled mechanism, operated by the successive closures and breaks of the circuit, caused, as above described, to move the said pointer to the character on the receiving-instrument corresponding to the character on the transmitting-instrument to which the pointer of the latter was moved, the pointer of the receiving-instrument remaining at said character until it is released by an act of the operator through devices provided for that purpose, and when so released the said pointer is returned to its starting position by a spring. The pointer of the receiving-instrument is therefore moved to position to indicate the desired character during the return of the pointer of the transmitting-instrument from a position pointing to the corresponding character, the signaling operation, excepting the movement of the pointer of the transmitting-instrument to the desired character, being automatic, all of which I will now proceed to describe and claim.

Figure 1:
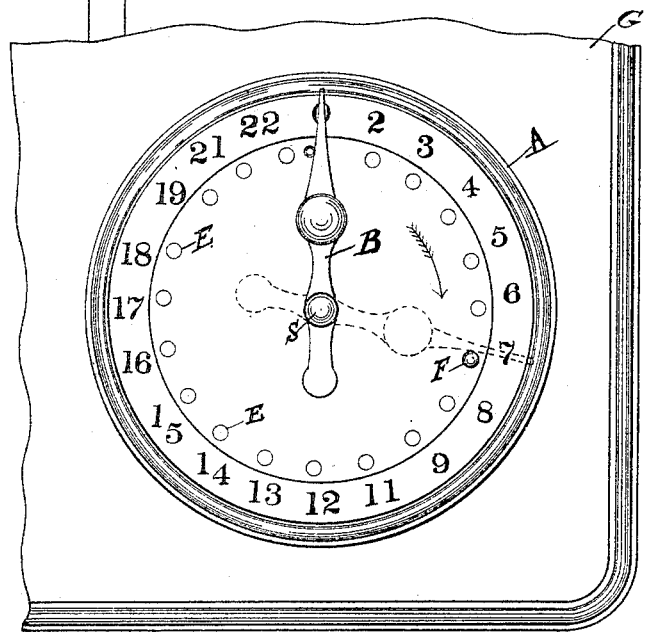

Of the accompanying drawings, forming a part of this specification, Figure 1 represents a plan view of the transmitter-dial and a portion of the table to which it is attached, said dial being preferably arranged horizontally. Fig. 2 represents a side elevation of recording-dial and case inclosing the mechanism, an electric connection being shown between these two figures. Fig. 3 represents an elevation of the mechanism of the receiving-instrument, the case, dial, and back plate being removed. Fig. 4 represents a bottom plan view of the mechanism of the transmitting-instrument with the bottom plate, the supporting board or table and the dial removed, an electrical connection being also here shown. Fig. 5 represents a side elevation of the mechanism of the receiving-instrument and a section of the front of the case and dial. Fig. 6 represents a side elevation of mechanism of the transmitting-instrument and a section of the board or table to which it is attached, also a cross-section of the dial and the circuit-closing rings, and the electrical connections, together with the call-bell. Fig. 7 represents a plan view of the self-adjusting stop used to limit the rotary movements of the spindle to one complete revolution of the pointer, permitting pointer to coincide with zero, which would be impossible were a stationary stop employed.

The same letters of reference indicate the same parts in all the figures.

In the drawings, G in Fig. 1 represents the board to which transmitter dial and mechanism is secured.

A represents the transmitter-dial, and B the pointer in position at zero.

S represents a shaft or spindle, to which is secured the pointer B. 5 represents a ratchet-wheel affixed to said spindle.

6 represents a gear-wheel, and 4 a toothed circuit closing and breaking wheel, the two latter being rigidly connected with each other by a hub common to both, said hub fitting loosely on the spindle, so as to permit the spindle to rotate freely within the hub, and retained in position vertically on the spindle by ratchet-wheel 5 upon one side and set-collar 15 on the other.

16 represents a coil-spring secured by one of its ends to spindle S, the other end being attached to a stud $S^2$ on the supporting-frame. Said coil-spring is used as the motive power to operate the mechanism of the transmitter, as hereinafter described. To the end of the spindle extending through the plate 20 is secured by a set-screw a collar 12, having an extension 12' upon one side, to be used as a stop, for the purpose described.

When the pointer B is in position at zero, the extension 12' comes in contact with a block 13, which is attached to the free end of a spring 22, attached at 21 to the plate 20. Said block is moved horizontally until stopped by a lug 14, fastened to the plate 20; but should it be desired to cause spindle S to make a complete rotation, then the extension 12' upon the collar 12 would come in contact with the other side of block 13, moving it horizontally to position shown by dotted lines in Fig. 7 in contact with lug 23, thereby permitting pointer to coincide with zero.

The speed of the rotation of the spindle S by the spring 16 is controlled by the escapement 11 and escapement-wheel 10, driven by spindle S through the medium of a system of gearing 6, 7, 8, and 9, as shown in Figs. 4 and 6.

The toothed wheel 4 is electrically connected with standard N by means of a contact-spring 2, secured to said standard at one end, its other end being in contact with teeth on wheel 4.

3 represents a contact-spring, one end of which is secured to a strip of vulcanized rubber V, fastened to frame-work, (for the purpose of insulation,) the other being slightly curved and placed in such a position that when toothed wheel 4 is rotated on its axis spring 3 is brought in contact with the ends of the teeth on the wheel 4.

I and I', Fig. 6, represent concentric metal rings attached to the inner side of the transmitter-dial A and separated from each other by an annular space, which coincides with a circular series of holes E, formed in the dial A, said holes corresponding in number and position to the characters on the dial A, as shown in Fig. 1, and each being adapted to receive a metallic pin F. Said pin serves both as a stop to limit the rotary movement of the pointer B, as hereinafter described, and as an electrical connection between the rings I I'. The rings I I' are connected by conducting-wires X X' with an alarm-bell $X^2$ at the receiving-station for the purposes of calling the attention of attendant to the indicator, so that when pin F is inserted in either of the holes of the transmitter electric circuit is completed and bell rings until pin is withdrawn. The contact-spring 2 is connected with magnet M by wire W', secured to plate 20 or end of post or standard N, as seen in Fig. 6. Contact-spring 3, by means of wire $W^{10}$ with said magnet and electric circuit, may be completed by contact of either of the teeth of wheel 4 with spring 3, said circuit including the springs 2 3, wheel 4, plate 20 of frame-work of instrument, wires W' $W^{10}$, and magnet M.

6', Figs. 2 and 5, represents the case containing the recorder mechanism; P, a circular frame attached to the front of the case 6' and containing the dial C. Attached to the end of the rotary shaft or spindle R, extending through dial C, is the pointer D, and to the spindle is secured the pinion 38, ratchet-wheel 28, and the stop-wheel 35, said pinion gearing into gear 22 secured to shaft 43. To the end of said shaft, which extends outwardly through plate 39, is attached one end of a volute or flat coil-spring 30, the other end of said spring being secured to a stud 44 upon plate 39.

To the plate 40 is attached an electro-magnet M M by means of the bar 45 and the bracket 46. Located within the field of attraction of said electro-magnet is the armature 24, which is pivoted at one end upon pivot 47, and has attached to its other end a pawl 25. Said magnet M attracts the armature 24 when energized and throws the pawl 25 forward one tooth on ratchet-wheel 28. When the current is broken by spring 3 and toothed wheel 4, the armature is released and is retracted by the spring 26 until stopped by the stop-screw 29, which is adjusted to limit the throw of said pawl to one tooth of the ratchet-wheel 28 at a time.

Spiral spring 26 has one end secured to the armature 24, while the other end is attached to frictional adjusting-pin 42. Said spiral spring has sufficient tension to overcome the stress of spring 30, and at the same time to wind up or increase the tension upon said coil-spring. The electro-magnet M' is attached to the plate 40 by means of the bracket 48, said bracket having an upward projection to which the armature 34 is pivoted.

Said armature is connected to lever 33, which has an oscillating movement upon a fulcrum 50, downward movement of armature being limited by the poles of the magnet M', while the pin 37 limits its upward movement. Projecting laterally from one end of lever 33, upon either side thereof, are the pins 49, which act upon the curved wires 31 and 32, attached, respectively, to the stop 27 and pawl 25, to raise said stop and pawl from contact with ratchet-wheel 28, said wires being arranged to bear on the pins 49, as shown in Fig. 3.

The wheel 35 has but one tooth or projection 35', which is adjusted so that when in contact with stop 51 the pointer or hand D will stand over zero on dial C.

The operation is as follows: Suppose it is desired to indicate the number 7 on indicator-dial at the receiving-instrument. First insert the plug F in the hole opposite the number 7 on the dial of the transmitting-instrument. Then revolve pointer B on its axis until it is brought in contact with said plug F, the latter by its contact with rings I I' completing the electrical connection between the contact-springs 2 3. The described movement of the pointer B and its spindle will increase tension in spring 16, which will cause the pointer of the spindle S to slowly rotate back until the pointer reaches zero, the speed of rotation of the spindle being regulated by the escapement through the medium of the gearing shown in Figs. 4 and 6, and above described. When pointer B was moved forward to the number 7 on the dial, the ratchet-wheel 5, attached to spindle S, was moved forward seven teeth. During the backward rotation of the spindle S by the spring 16, the ratchet 5 engages the pawl 18, which is pivoted to gear 4 and rotates said ratchet and the toothed wheel 6 thereto attached, causing said toothed wheel to rotate until seven of the teeth on its periphery have been brought in contact with the spring 3, thereby causing circuit to be closed seven times through the magnets M M and the wires W' and W¹⁰, said magnets being thus caused to attract the armature 24 the same number of times and causing the pawl 25 to rotate the ratchet-wheel 28 forward a corresponding number of teeth, so that the pointer D of the receiving-instrument will indicate the number 7. The pointer D remains at the position to which it was thus moved until the operator, after noting the number, presses a push-button K in any convenient location, and thus closes the circuit through the magnet M' M', which attracts armature 34, which moves the lever 33 in the direction required to lift pawl 25 and stop 27 from contact with ratchet-wheel 28, thereby allowing said wheel and the spindle R and pointer D to rotate back to zero. The lever 33 is pivoted sufficiently at one side of its longitudinal center to enable its end in which the pin 49 is inserted to counterbalance the armature and raise it from the poles of magnet M', when the circuit is broken through said magnet. When the pin F is withdrawn from the hole E, in which it was inserted, the circuit is broken, so that the magnet M M cannot be energized until the pin is reinserted.

We claim—

1. In an electric signaling apparatus, the combination of a dial having a series of concentrically-arranged characters, a rotary shaft or spindle at the center of said dial, said shaft having a hand or pointer, a spring connected with said shaft and arranged to be compressed by the forward rotation thereof and to forcibly rotate the shaft backward when the latter is released and an arm or projection affixed to said shaft, a spring-supported block having a limited movement for automatically limiting the rotation of the shaft in both directions, a circuit closing and breaking wheel rotated by the backward rotation of said shaft a distance corresponding to the forward rotation thereof by the operator, and an escapement which controls the rate of movement of said shaft and wheel, as set forth.

2. In an electric signaling apparatus, the combination, with a receiving-instrument having a series of characters and a pointer, of a transmitter comprising a dial having a series of concentrically-arranged characters corresponding to those of said receiving-instrument, a rotary shaft or spindle at the center of said dial, said shaft having a hand or pointer, a spring connected with said shaft and arranged to be compressed by the forward rotation thereof and to forcibly rotate the shaft backward when the latter is released, an arm or projection affixed to said shaft, a spring-supported block having a limited movement for automatically limiting the rotation of the shaft in both directions, a circuit breaking and closing wheel rotated by the backward rotation of said shaft a distance corresponding to the forward rotation thereof by the operator, an escapement which controls the rate of movement of said shaft and wheel, and the electrical connection between said transmitter and receiving-instrument, as set forth.

3. The combination of the spindle or shaft S, the dial having the concentrically-arranged characters, the spring 16, attached at one end to said shaft and at the other end to a fixed support, the arm 12', affixed to said shaft, the spring-supported block 13, and the fixed blocks or abutments 14 23, arranged to co-operate with said arm in arresting the rotation of the shaft in both directions, as set forth.

4. In an electric signaling apparatus, the combination of a dial having a series of concentrically-arranged characters, and a corresponding series of plug-receiving holes, concentric metal rings within the dial separated by an annular space which coincides with said series of holes and arranged so that a plug inserted in either hole will electrically connect said rings, a rotary shaft or spindle at the center of said dial carrying a pointer, a spring connected with said spindle and with a fixed support, a circuit breaking and closing wheel 4, loosely mounted on said spindle, means for operatively engaging the spindle with said wheel when the spindle is rotated backwardly by its spring, whereby the wheel is rotated a distance corresponding with the extent of movement imparted to the spindle 2 3, electrically connected with the magnet M and arranged to make contact with the wheel 4, whereby contact of the spring 3 with wheel 4 closes the electric-circuit-operating magnet M at a distant station, as set forth.

5. In an electric signaling apparatus, a receiving-instrument in which are combined a dial having a series of characters, a rotary spindle or shaft at the center of said dial having a pointer, a ratchet-wheel 28, and a gear 38, and a stop-wheel 35, attached to said spindle, a stop or dog 51, engaged with said stop-wheel, a pawl 25, engaged with the ratchet-wheel 28, an electro-magnet M, the armature of which is connected with said pawl, the arrangement being such that the pawl is moved backwardly over the ratchet by the attraction of the armature to the poles of the magnet, a retracting-spring connected with said armature and arranged to move the pawl forward on the release of the armature, thereby partially rotating the ratchet and spindle, a gear 22, meshing with the gear 38 on the spindle-shaft, and a spring connected with said gear 22 and adapted to rotate the latter in the direction required to return the pointer on the spindle to zero upon the release of the spindle, as set forth.

6. The combination, with the dial $c$, spindle R, and pointer D, of the stop-wheel 35, and ratchet-wheel 28, affixed to said spindle, the stop 27, and pawl 25, engaged, respectively, with the stop-wheel and ratchet-wheel and provided, respectively, with the arm 31 and the arm 32, means for operating said pawl to impart a step-by-step rotation to the spindle, an electro-magnet M', having an armature 34, a lever 33, connected with said armature and engaged with the arms 31 and 32, whereby the stop 27 and pawl 25 may be simultaneously raised from the stop-wheel and ratchet-wheel when the circuit is closed through said magnet, thereby releasing the spindle, and means for rotating the spindle and its pointer back to zero when the spindle is released, as set forth.

7. As a means for automatically limiting the rotation of a shaft in both directions, the combination, with such shaft, of an arm or projection affixed thereto, a spring-supported block standing in the path of said arm, and two fixed abutments arranged at opposite sides of said block, as set forth.

In testimony whereof we have signed our names to this specification, in the presence of two subscribing witnesses, this 29th day of November, A. D. 1889.

DENNIS KELLEY.
MELVILLE C. PARKHURST.

Witnesses:
ROBERT R. PERRY,
RICHARD P. ELLIOTT.